United States Patent [19]

Buja

[11] 4,370,124
[45] Jan. 25, 1983

[54] MODULAR ROTARY MOLDING MACHINE

[76] Inventor: Frederick J. Buja, 104 Shale Dr., Rochester, N.Y. 14615

[21] Appl. No.: 274,472

[22] Filed: Jun. 17, 1981

[51] Int. Cl.$^3$ .............................................. B29F 1/00
[52] U.S. Cl. ................................... 425/556; 425/576; 425/589; 425/588
[58] Field of Search ................... 264/37; 425/575, 576, 425/556, 589

[56] References Cited

U.S. PATENT DOCUMENTS

| | | | |
|---|---|---|---|
| 3,173,176 | 3/1965 | Kobayashi | 425/576 X |
| 3,833,329 | 9/1974 | Ulmschneider et al. | 425/556 |
| 3,888,615 | 6/1975 | Ulmschneider et al. | 425/575 |
| 3,993,787 | 11/1976 | Nakabayashi et al. | 425/575 X |
| 4,186,161 | 1/1980 | Ulmschneider et al. | 264/37 |
| 4,307,057 | 12/1981 | Hettinga | 425/576 X |

Primary Examiner—J. Howard Flint, Jr.
Attorney, Agent, or Firm—Shlesinger, Fitzsimmons & Shlesinger

[57] ABSTRACT

This machine has a turret which rotates about a horizontal axis on a frame that is movable into and out of a loading position adjacent a rotary extruder. The turret comprises a tubular shaft, a plurality of axially spaced, circular plates secured to the shaft coaxially thereof, and a plurality of identical, radially projecting panels that are secured in registering radial slots in the circular plates. A separate mold is mounted in the angular space between each pair of adjacent panels, and comprises a stationary section fixed to one of the circular plates for rotation therewith, and a movable section mounted for reciprocation by a collapsible linkage into and out of a closed position against the associated stationary section. As each mold rotates past the loading station the associated linkage closes the movable mold section, a supply of molten molding material is then fed by the extruder to an axial bore in the stationary section of the mold, a hydraulically actuated ram then enters the now-loaded bore and forces the molding material into a cavity in the mold, the ram is then withdrawn, and thereafter the mold sections are separated and the molded part is ejected from the turret. The size of the turret can readily be increased or decreased merely by changing the overall sizes of the panels and the associated supporting plates.

24 Claims, 6 Drawing Figures

MODULAR ROTARY MOLDING MACHINE

BACKGROUND OF THE INVENTION

This invention relates to rotary molding machines, and more particularly to continuous injection molding machines for manufacturing thermoplastic products.

The prior art discloses a number of injection molding machines of the rotary type, including the continuous injection variety as described, for example in U.S. Pat. Nos. 3,833,329; 3,888,615; 3,888,616; 3,888,619 and 4,186,161. The machines disclosed in these particular patents, however, have the disadvantage that they are extremely costly to design and manufacture. Although they can be made with any desired number of molding assemblies or work stations that are repeatedly operable to mass produce a given, molded part, such machines otherwise are not readily convertible to produce other parts, nor are they themselves capable of being mass produced. Moreover, these prior machines tend to be rather inefficient, since their die cavities are designed to be supplied with an excess amount of potting or molding material, which must be separately withdrawn and discarded following each molding operation of a die. The act of separating the excess material from the molded part is a more complex operation. Also, the molds are usually difficult to service and repair.

SUMMARY OF THE INVENTION

One of the primary objects of the invention is to provide a modular type rotary molding machine which is produced from a series of parts that can be readily manufactured in different sizes to produce rotary molding machines having selectively different numbers of working stations, for example, 12, 18, 24, 30, etc. To this end it is an object also to produce a rotary turret comprising a central shaft, a plurality of discs of generally similar configuration secured coaxially to said shaft at axially spaced points therealong, a plurality of flat, similarly shaped panels secured in registering, radial slots in said discs to be supported thereby in equi-angularly spaced radial relation about said shaft, and a mold assembly mounted in each of the angular spaces formed between adjacent panels. Thus the number of mold assemblies or working stations on each turret can be increased or decreased depending upon the number of radial slots formed in each disc, and consequently the number of radial panels mounted in these slots. Likewise, the overall size of the turrent can be increased merely by increasing the respective sizes of the discs, panels and molding assemblies depending, for example, on the size of the part that is to be molded.

In addition, this invention includes improved die closing mechanisms which can be readily adjusted to vary the die-closing pressure; and the molding dies and rams are designed substantially to eliminate or minimize molding material waste and simplify the removal of molded plastic material. And in one embodiment the movable mold sections are mounted for swinging movement into ejection positions which make the molds readily accessible for repair or maintenance.

THE DRAWINGS

DETAILED DESCRIPTION OF THE INVENTION

Figure 1:
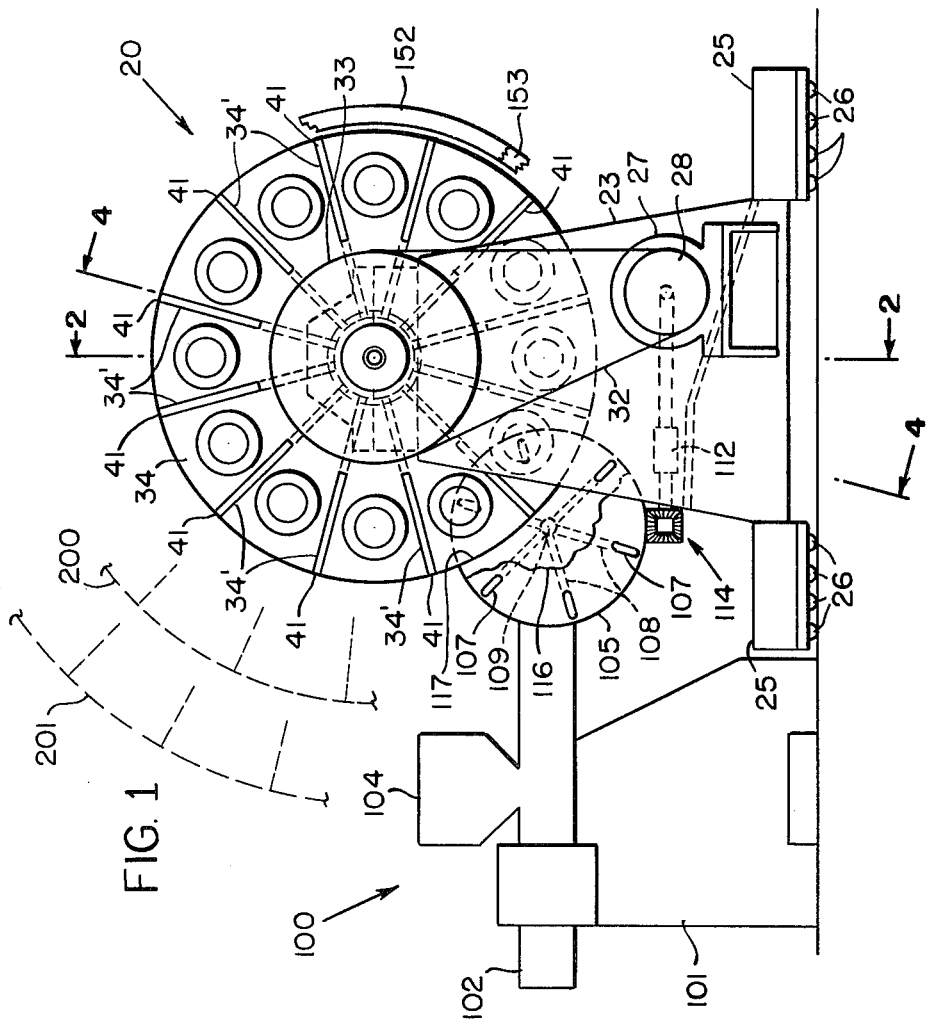
FIG. 1 is an end elevational view of a molding machine and associated extruder mechanism made according to one embodiment of this invention; and with part of the extruder feeder plate being cut away.

Referring now to the drawings by numerals of reference, 20 denotes generally the rotary turret of a continuous injection molding machine of the twelve station variety. The turret includes a horizontally disposed tubular shaft 21, opposite ends of which are rotatably journaled in a pair of roller bearings 22 (FIG. 2) that are fixed in registering openings formed in the upper ends of a pair of spaced, vertically disposed support plates 23 and 24, respectively. The plates 23 and 24 are fixed to a tubular frame or sump 25, which surrounds the base of the turret 20. The frame is mounted on rollers 26 at opposite sides of the turret to enable the turret to be moved relative to an extruder as noted hereinafter.

Mounted on a bracket 27 (FIGS. 1 and 2) which is secured to the outside of plate 23 adjacent its lower edge, is a turret drive motor 28, the drive shaft 29 of which is rotatably supported at its outer end in a bearing 30 that is fixed in a registering opening in the end plate 23. Shaft 29 has fastened thereon a sprocket wheel 31, which is drivingly connected by chain 32 to a sprocket wheel 33 of substantially larger diameter that is fixed to the adjacent end of shaft 21 to impart rotation thereto when the drive motor 28 is energized.

Figure 4:
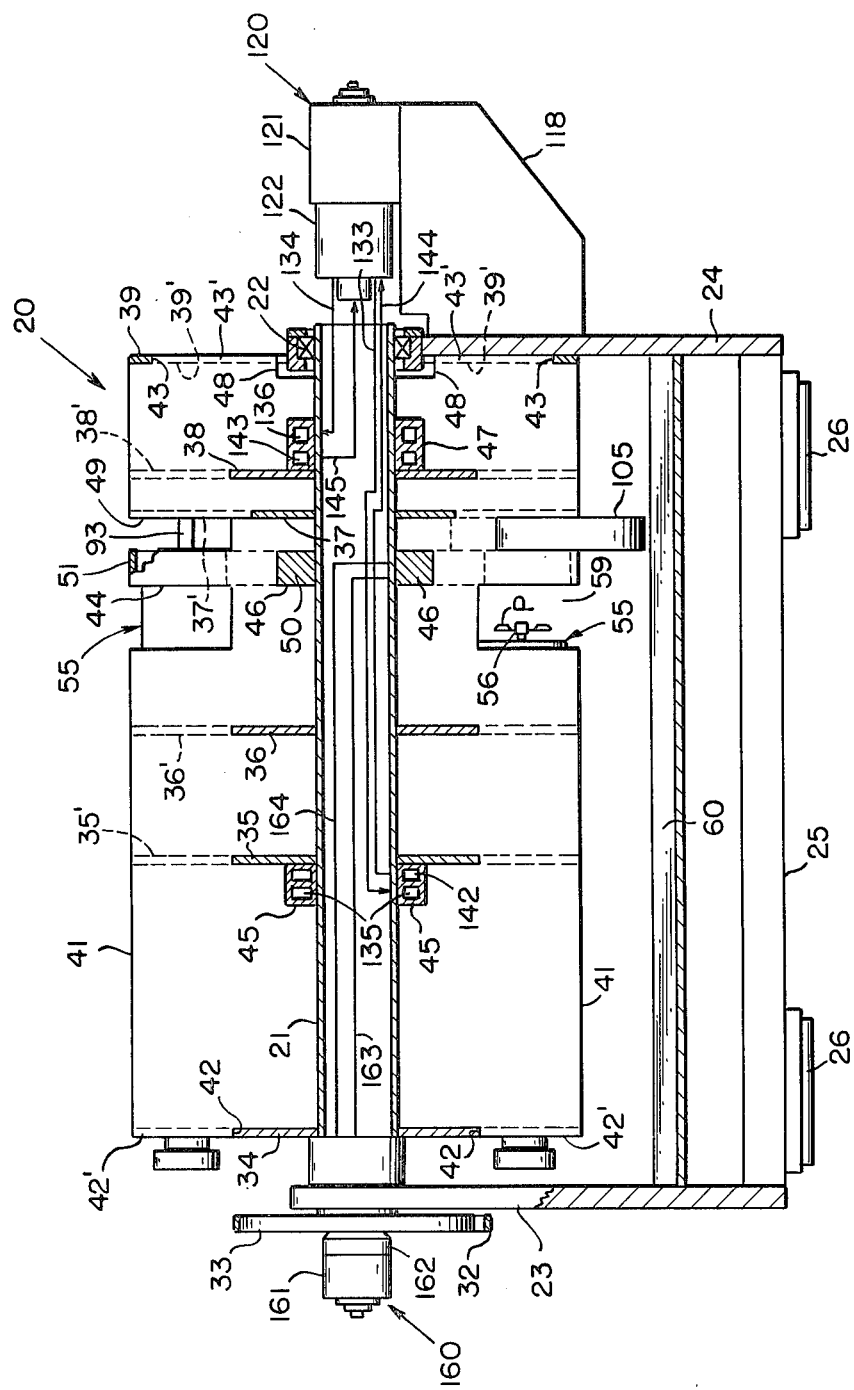
FIG. 4 is a sectional view taken along line 4—4 in FIG. 1 looking in the direction of the arrows, and again with certain parts being shown in full.

Mounted on shaft 21 coaxially thereof and at axially spaced points therealong are six, circular, metal plates 34, 35, 36, 37, 38 and 39. These plates, which are generally similar in configuration, have equal outside diameters and registering axial bores surrounding the outer peripheral surface of shaft 21. Plate 34, which is located at one end of turret 20 (the left end in FIG. 2), is spaced from the adjacent bearing 22 by a sleeve 40. As shown more clearly in FIG. 1, plate 34 has therein twelve equiangularly spaced, radially extending slots 34', which extend part way inwardly from the outer circumferential surface of plate 34 for equal distances. The plates 35, 36, 37 and 38 are similar in this manner to plate 34, each having therein twelve radial slots 35', 36', 37' and 38', respectively, (FIG. 4) which register axially with the slots 34' in the end plate 34. Although plate 39 likewise has therein twelve, equiangularly spaced slots 39' (FIG. 4) which register axially with the slots in the plates 34 through 38, the slots 39' do not open on the outer, circumferential surface of the plate 39, but instead extend from its bore only part way outwardly toward its outer circumferential surface.

Seated in the aligned radial slots in the plates 34 through 39, and projecting radially outwardly from the outer peripheral surface of shaft 21 at twelve equiangularly spaced points thereabout, are twelve, identically-shaped plates or side panels 41. Each panel 41 has at its left end (FIG. 4) a first radial notch 42 extending from its inner edge to accommodate the hub or un-notched portion of the end plate 34, and a projection 42' which extends into one of the slots 34' in plate 34. At its right end panel 41 has another radial notch 43 in its outer edge for accommodating the un-notched, circumferential marginal portion of the opposite end plate 39, and another projection 43' which extends into one of the slots 39' in plate 39. Plates 34 and 39 are welded to opposite ends of panels 41 to prevent any radial movement thereof relative to the shaft 21.

Intermediate its ends each panel 41 has in its outer edge two rectangular notches 44 and 49 (FIG. 4), and in its inner edge three, spaced notches 45, 46, and 47, which open on the outer peripheral surface of the shaft 21 at three axially-spaced points therealong. As shown more clearly in FIG. 4, the respective notches 44 and 49 register with each other to form a pair of annular passages surrounding the outside of turret 20; and the notches 45, 46, 47 respectively, register with each other to form three, axially-spaced annular spaces around the outside of the shaft 21 for purposes noted hereinafter. One further notch 48 is formed in the right end (FIG. 4) of each panel 41 along its inner edge to form an annular space to accommodate the housing for the bearing 22 which supports one end of shaft 21.

Secured coaxially to shaft 21 in the annular space formed by the panel notches 46 is the hub of an annular, mold-supporting member 50. Bolted or otherwise secured between adjacent panels 41 to the outer surface of member 50 at equiangularly spaced points around its periphery are twelve, stationary mold sections 51 (stationary in the sense that they are fixed to panels 41 of the rotatable turret 20), each of which sections has therethrough an axial bore 52 that opens at one end on an annular mold chamber 53. As shown more clearly in FIG. 2, these chambers 53 lie in a common vertical plane and face in the direction of the driven or left end of shaft 21.

Mounted to reciprocate toward and away from the mold chambers 53 are twelve, movable mold sections 55 (FIG. 2), which are equiangularly spaced about the axis of shaft 21, and each of which contains a movable, cylindrical plunger 56 that registers coaxially with the bore 52 of a stationary mold section 51. Each movable mold section 55 reciprocates in a housing formed by a pair of spaced housing walls 57 and 58, which are fixed at one end to plate 36 and project at their opposite ends toward the associated stationary mold section 51. The outer wall 57 of each of these housings projects only part way toward the associated mold section 51, so as to leave in the turrent an opening 59 (FIG. 2) through which a complete, molded part P can be ejected onto an inclined wall 60 of the frame as noted hereinafter.

Each mold section 55 is fastened at one end (its left end in FIG. 2) to one end of a reciprocable operating rod 61, which is supported intermediate its ends for sliding movement in the bore of bushing 63. Each bushing 63, twelve in all, is secured intermediate its ends in one of twelve openings formed in the support plate 36 coaxially of the bores 52 in the stationary mold sections 51. At its opposite or left end (FIG. 2) each operating rod 61 extends into the space between plates 35 and 36 and is pivotally connected by a pin 64 to one end of a link 65, the opposite end of which is pivotally connected to one corner of a triangularly shaped lever or link 66. A second corner of each lever 66 is pivotally connected by a pin 68 to one end of another rigid link 69, the opposite end of which is pivotally connected as at 71 to one end of a headed pin 72. The opposite end of each pin 72 has an enlarged diameter head which is mounted for limited axial movement in the bore of one of twelve externally-threaded sleeves 74, each of which is adjustably threaded in the bore of one of twelve bushings 75 that are fixed in equiangularly spaced openings formed in plate 34 adjacent its outer peripheral edge. A resilient compression spring 76 is secured in the bore of each sleeve 74 between the associated headed pin 72 and a plug 77, which is threaded into the outer end of each sleeve 74.

The remaining or third corner of each lever 66 is pivotally connected to one end of a reciprocable piston rod 81, the opposite end of which is slidable in the bore of a cylinder 83. At its end remote from the associated lever 66 each cylinder 83 is pivotally connected by a pin to one of twelve brackets 85, which are fastened to the inside surface of the end plate 34 adjacent its inner, circumferential edge, and at equiangularly spaced points about its axis.

While only one operating rod 61 and its associated links 65, 66 and 69 have been described in detail herein, it is to be understood that twelve such linkages exist at equiangularly spaced points around the axis of shaft 21, and each such link 69 is connected by its associated pin 72 to an adjustable sleeve of the type denoted at 74.

As noted in greater detail hereinafter, the cylinders 83 are adapted selectively to be supplied with a fluid under pressure to cause the piston rod 81 of an associated cylinder to advance to its outermost or extended position as shown in the upper half of FIG. 2, in which case it forces the associated link 66 outwardly and upwardly, thereby swinging the attached links 65 and 69 into approximately linear registry with each other. This movement ceases when link 66 strikes the inner end of an adjustable stop member or screw 87, which is fastened by a bracket 88 to an adjacent panel 41 to limit the pivotal movement of each link 69 in one direction about its pivot point 71. When this extension of a respective piston rod 81 occurs, its associated links 65, 66 and 69 cause the attached operating rod 61 to force the associated mold section 55 toward the right in FIG. 2 until it engages the confronting face of the associated stationary mold section 51, thereby operatively sealing the open end of its mold chamber 53, and causing the head of the plunger 56 in section 55 to project into and to seal one end of the bore 52 in the registering section 55. Under these circumstances the mold is closed and is ready to have the molding material injected into its cavity 53 as noted hereinafter.

Figure 2:
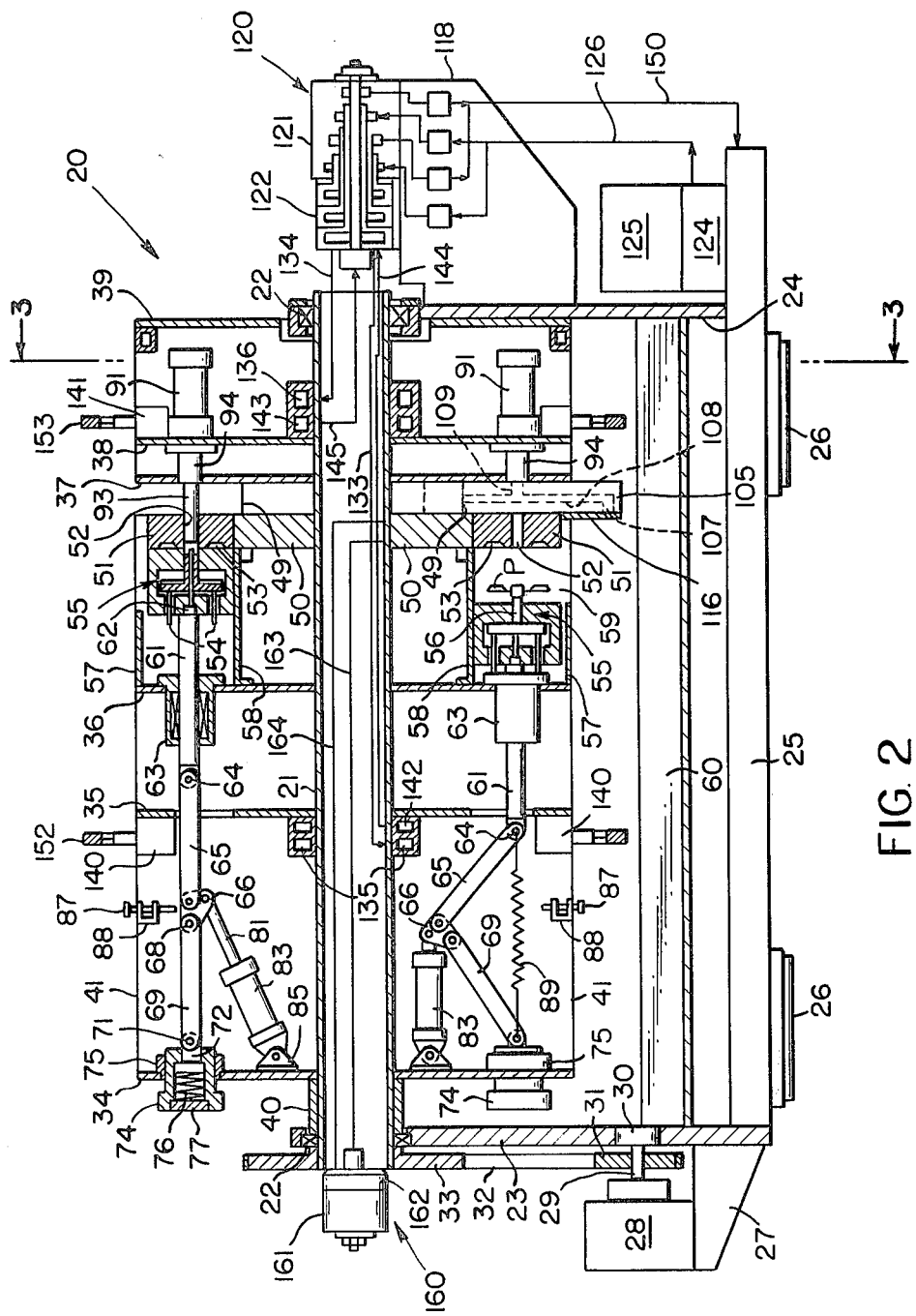
FIG. 2 is a fragmentary sectional view of this machine taken generally along line 2—2 in FIG. 1 looking in the direction of the arrows, but with portions of the machine and its associated extruder being shown in full.

After a molding operation has taken place the associated cylinder 83 is operated to cause its piston 81 to be retracted, thereby collasping the associated linkage 63, 65, 60 into the mold-open position as shown in the lower half of FIG. 2, during which operation a spring 89 (FIG. 2) withdraws the associated mold section 55 into its retracted position wherein it is axially spaced from the associated stationary mold section 51, also as shown in the lower half of FIG. 2. At this time, pins 54 (FIG. 2), which project slidably out of the back of each mold section 55, engage the head of the registering bushing 63 and cause the attached ejection sleeve 56 to advance slightly out of the associated mold section to eject from retractor pin 62 a molded part P, which is then discharged downwardly onto plate 60 out of the associated opening 59 in the turret.

Secured at their forward ends to one side of the circular mounting plate 38 (the right side thereof as shown in FIG. 2), and projecting at their opposite ends into the space between plates 38 and 39, are twelve injection cylinders 91, the axes of which extend parallel to shaft 21 coaxially of the bores 52 in the stationary mold sections 51. Each cylinder 91 controls a piston rod 93, which reciprocates coaxially of the associated cylinder between a retracted position (bottom part of FIG. 2) in which it is withdrawn into a bushing 94, which is fastened to the forward end of each cylinder 91 between the plates 37 and 38, and an advanced or extended position (as shown in the upper part of FIG. 2) in which the rod 93 projects coaxially into the bore 52 of a registering mold section 51 for purposes noted hereinafter.

Figure 3:
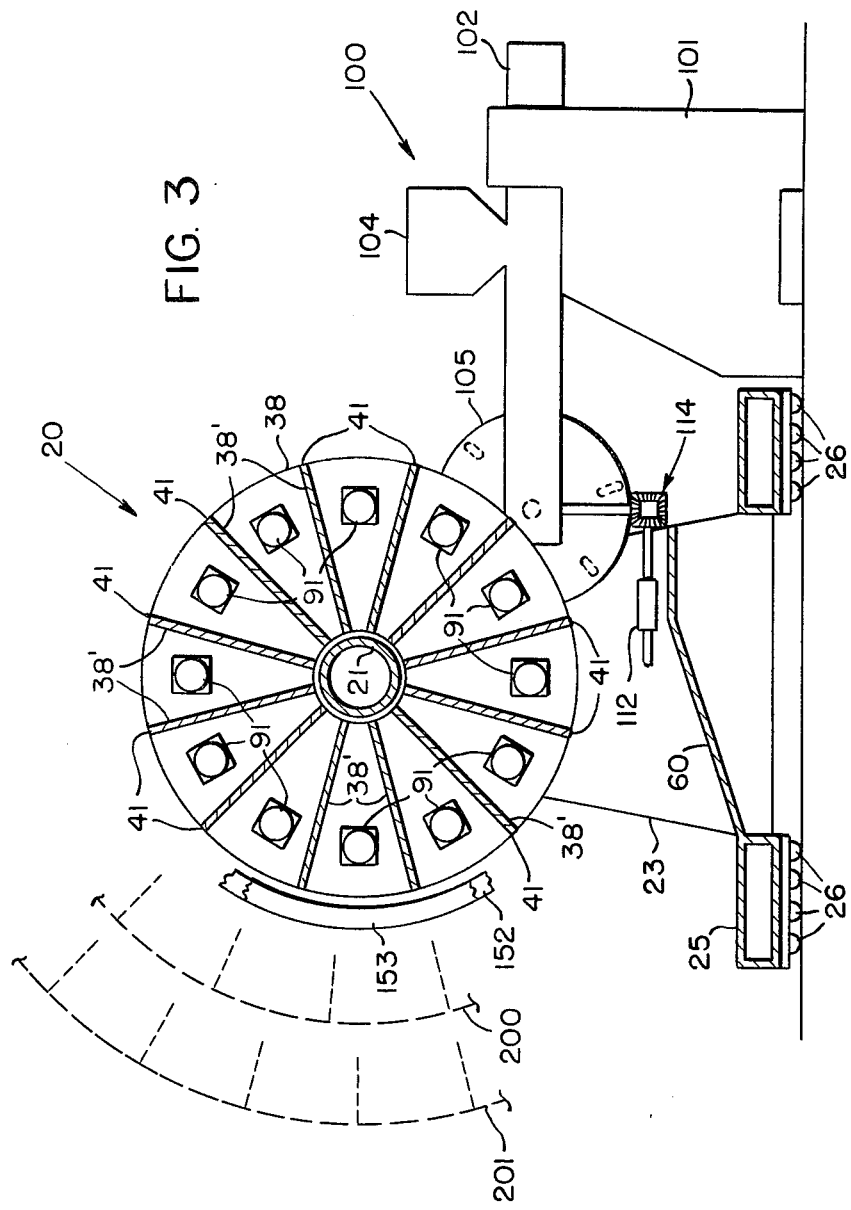
FIG. 3 is a sectional view of this machine taken along line 3—3 in FIG. 2 looking in the direction of the arrows, but with parts thereof shown in full.

Mounted adjacent one side of the turret 20 is a stationary extruder mechanism, which is denoted generally at 100 in FIGS. 1 and 3. This mechanism, parts of which are shown schematically in the drawings, comprises a base or frame 101 having thereon a tubular extruder section 102, the discharge end of which extends beneath one side of the turret 20, when the latter is in its mold charging position as shown in the drawings. Mounted on section 102 to communicate with its feed screw (not illustrated) is the usual hopper 104 for holding a supply of molding material. Rotatably mounted on the discharge end of the extruder section 102 for rotation about an axis parallel to shaft 21 is a circular feeder plate 105. When the turret 20 is in its mold charging position, this plate 105 projects into the annular space formed by the panel notches 49 between the mold sections 51 and the circular mounting plate 37 to supply mounting material one after another to the bores 52 in the mold sections 51 as the shaft 21 rotates.

For this purpose plate 105 has a plurality of radial recesses 107 in the side thereof which faces the mold sections 51, and intermediate its sides has a like plurality of radial ports 108, which connect the recesses 107 to a central bore 109 that opens on the side of plate 105 opposite of that of its recesses 107. Bore 109 is connected to the discharge end of the extrusion section 102 to receive molding material delivered by the screw in section 102.

The turret drive motor 28 is releasably connected by a conventional drive system, which includes a slip joint 112 (FIGS. 1 and 3), with a gear train denoted generally at 114. This train in turn is operatively connected in any conventional manner to the feeder plate 105 so as to rotate the latter in synchronization with turret 20, and in such manner that the recesses 107 in plate 105 are rotated successively into registering relation with the bores 52 in successive sections 51 as the turret 20 rotates, thereby to load each such bore with molding material after the associated mold section 55 has been moved into its closed position.

Mounted adjacent the side of plate 105 that faces the molds 51 is a stationary cover member 116, which overlies and covers all of the recessed face of plate 105 except that portion which extends into confronting relation with the mold sections 51. Cover 116 has in its periphery an arcuate notch 117 which confronts the outer periphery of the turret so the cover 116 does not interfere with the rotation of the turret. The cover 116 thus functions to cover the recesses 107 in plate 105 before and after the pass into mold feeding relation with respective mold section 51.

After the bore 52 in a given mold has been filled, the associated injection cylinder 91 is energized to drive its rod 93 into the registering, now-filled bore 52 of the associated stationary mold section 51, thereby to force the molding material into the closed chamber 53, and around a small, reduced-diameter retractor pin 62 which projects from the end of plunger 56 part way into the mold cavity. This produces by injection molding the part P. As noted above, after the part P has been molded, the movable mold section 55 is retracted so that the pins 54 on the back thereof engage against the associated bushing 63 to cause the part P to be ejected off the retractor pin 62 and out of the machine.

Figure 5:
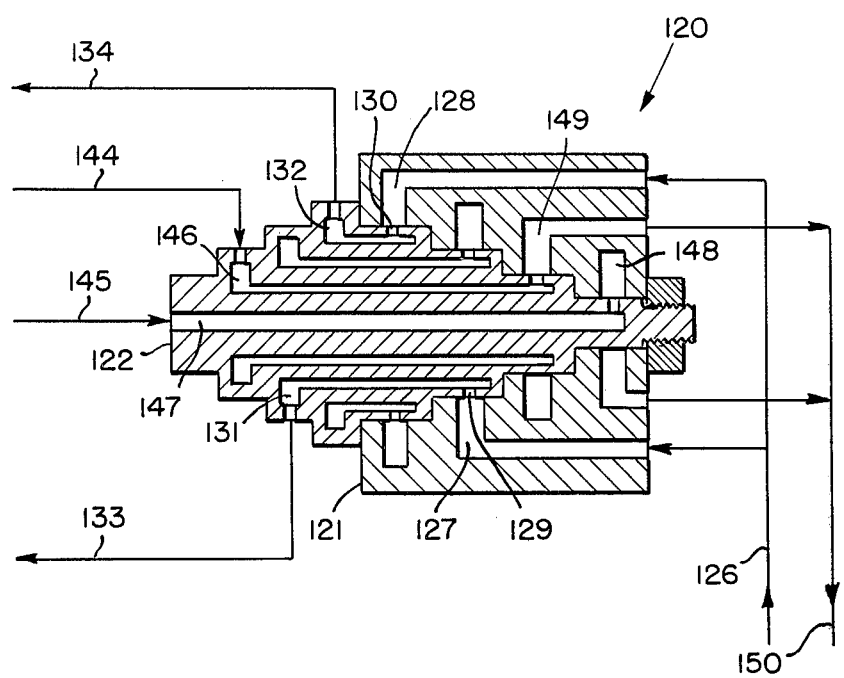
FIG. 5 is a sectional view through the center of a hydraulic coupler used in this machine.

Secured on a bracket 118 (FIGS. 2 and 4), which projects from the outer surface of support plate 24, is the stationary section 121 of a hydraulic coupling mechanism 120, which includes a rotary joint section 122 that projects coaxially and rotatably into section 12. As shown schematically by the arrows in FIGS. 2 and 5, fluid under pressure is supplied to section 121 by a high pressure hydraulic pump 124, which is driven by a motor 125, and which has its input in communication with fluid in the sump 25. The output of pump 124 is conveyed by a line 126 to a pair of separate chambers or plenums 127 and 128 in the coupling section 121. Plenums 127 and 128 in turn communicate through ports 129 and 130, respectively, with plenums 131 and 132 respectively, in the rotary section 121.

The plenums 131 and 132 are connected by supply lines 133 and 134 with supply plenums 135 and 136, which surround shaft 21 for rotatiion therewith adjacent panels 35 and 38, respectively. The supply plenum 135 is connected by conventional means (not illustrated) with a plurality of solenoid valves 140 (FIG. 2) which are fastened to panel 35 adajacent its outer periphery, and each of which valves is connected to a different one of the mold clamping cylinders 83 to control the flow of hydraulic fluid to and from these cylinders. Similarly the supply plenum 136 is connected to another plurality of solenoid valves 141 (FIG. 2), which are connected to the injection cylinders 91 to control the operation of the latter.

The solenoid valves 140 and 141 are also connected to return plenums 142 and 143, which surround shaft 21 adjacent the supply plenums 135 and 136, respectively. The return plenums 142 and 143 are connected by lines 144 and 145 with plenums 146 and 147, respectively, in the rotary section 121 of coupling 120, which in turn communicate with discharge or exhaust plenums 148 and 149 in the stationary section 121. Plenums 148 and 149 are in turn connected by a return line 150 to the sump 25.

The solenoid or sequence valves 140 and 141 are operated by switches which have operating arms that project into sliding engagement with camming surfaces formed on the inner peripheries of a pair of axially spaced, stationary ring cams 152 and 153 (FIGS. 1–3), which surround the outer peripheral surface of turret 20 adjacent the panels 35 and 38 respectively. These cams 152 and 153 have their surfaces designed to energize the solenoids 140 and 141 in a predetermined sequence, so that for each revolution of turret 20 each pair of mold sections 51, 55 will produce a part P.

During a molding operation the mold sections 51 are adapted to be cooled by a fluid supplied through a coupling mechanism 160 mounted at the end of shaft 21 remote from the coupling device 120. As in the case of the latter, cooling fluid is supplied through a stationary section 161 of coupling 160 to a rotary section 162, which has its output port connected to a supply line 163, and its return or exhaust port connected to a line 164. Line 163 is connected through supply and return plenums (not illustrated) in the mold support 50 with each stationary mold to circulate cooling fluid therethrough in any conventional manner.

One of the principal advantage of the modular style of machine is that it can be made selectively in various sizes without departing from the basic concept. For example, the machine in the illustrated embodiment has been designed with twelve stations, or twelve separate molds. However, simply by increasing the diameter of the plates 34–39 and the panels 41, and of course making corresponding adjustments in the sizes of support plates 23, 24 and drive chain 32, it is possible readily to manufacture similar machines having, for example 18, 24, 30 or more stations. The general outline of an 18 station machine, for example, is shown fragmentarily and by broken lines at 200 in FIG. 3, and a 24 station machine is denoted similarly by broken lines at 201.

Still another advantage of this novel machine lies in the single die height adjustment feature afforded each mold by virtue of the associated, manually adjustable clamping linkage for each movable mold section 55. By rotating the sleeves 74 the closing pressure exerted by the four bar linkage on the associated mold section 55 can be increased or decreased, as desired. Although the turret 20 has been mounted for rotation about a horizontal axis, it will be apparent that it could also be mounted for rotation about a vertical axis, with only slight modifications which should be readily apparent to one skilled in the art. By moving the turret 20 toward and away from the stationary extruder mechanism it is possible to gain ready access to the extruder and mold sections, respectively, for repair and maintenance thereof.

The rotary disc or plate 105 on the extruder mechanism is driven by the same power source as the turret 20, so that it is a relatively easy matter to synchronize its rotation with that of the turret in order to supply molding material through its slots or recesses 107 to the pots in the mold sections 51 as the latter rotate continuously past the extruder during machine operation. The size of plate 105 and its cover will, of course, have to be modified depending upon whether the turret 20 has been provided with 12, 18, 24 or 30 stations.

The molds can be treated, as desired, by electricity, hot water or hot air, and as described above, may be cooled during the cooling cycle thereof by fluid supplied through the coupling 160. Since the panels 40 and their supporting discs 34–39 are similar in configuration (although perhaps different in overall size) for one size machine to another, it is relatively simple to increase a machine's capacity merely by anticipating future needs and then adding or subtracting stations as may be desired. For machines of the same size, the panels 41, plates 34–39 and the four bar linkage mechanisms for the mold clamps, all lend themselves readily to mass production because of their simplicity of design.

It is important to note also that each of the stationary mold sections 51 is bolted or otherwise releasably secured between adjacent panels 41, so that it is a relatively simple matter to remove and replace the illustrated mold sections 51 with a different series of stationary mold sections that have, for example, a mold chamber 53 which is different in configuration from that shown in the drawings. This makes it a relatively simple matter to use the same machine for mass producing molded parts of different configuration on the same machine.

Figure 6:
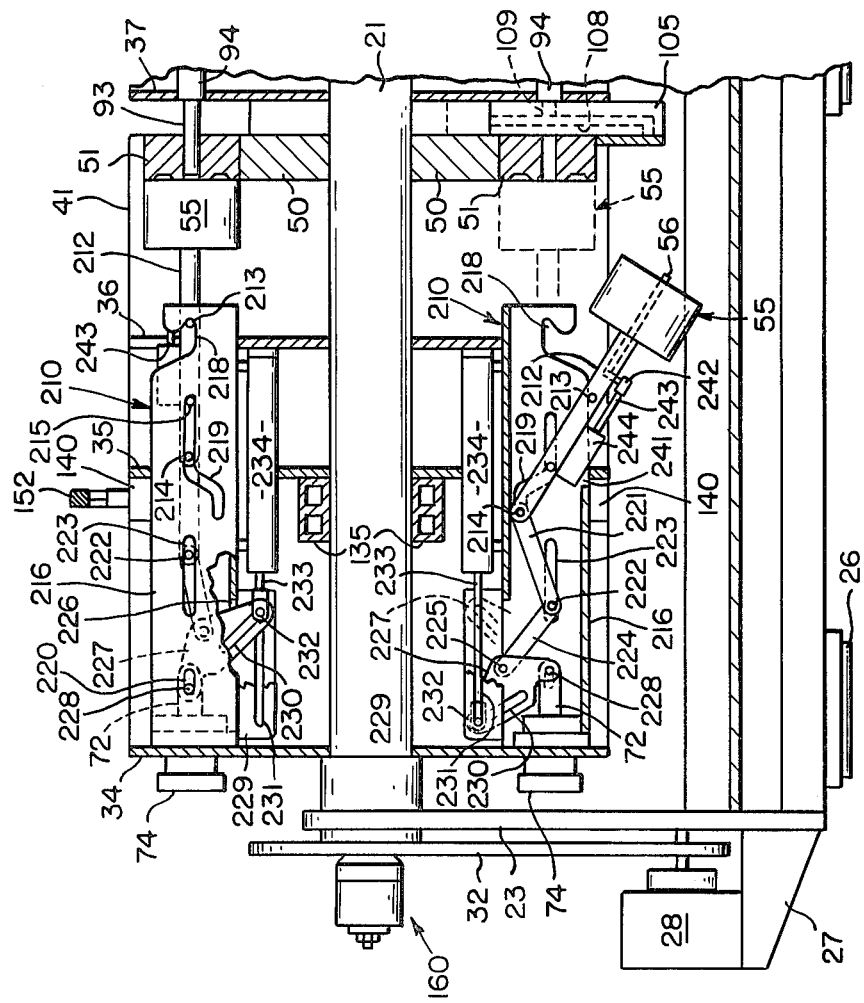
FIG. 6 is a fragmentary sectional view generally similar to FIG. 2, but showing a modified mechanism for manipulating the movable mold sections.

In the embodiment shown in FIG. 6, wherein like numerals are employed to denote elements similar to those employed in the preceding embodiment, 210 denotes generally a modified mechanism which may be employed for manipulating a movable mold section 55. Although twelve such mechanisms would be required for the illustrated embodiment, they are identical in construction, so only two of them are illustrated and described in detail in connection with FIG. 6.

In this embodiment each movable mold section 55 is secured to the forward end of a cylindrical operating rod 212, which supports three spaced pairs of diametrally opposed pivot pins 213, 214 and 215, which project from opposite sides of each rod 212 rearwardly of the associated mold section 55. Each of twelve tubular housings 216, which are rectangular in cross section, is fastened at one end to plate 34 over the inner end of an adjusting sleeve 74 to surround the associated pin member 72. At its opposite or inner end each housing 216 projects through registering openings in the plates 35 and 36 and part way into the axial space between plates 36 and 37.

Each mold supporting rod 212 has its three sets of pivot pins 213, 214 and 215 guided for sliding movement in two spaced pairs of registering camming slots 218 and 219, respectively, which are formed in the opposed sidewalls of each housing 216 intermediate its ends. Each pin 214 is pivotally connected in its associated housing 216 with one end of a lever 221, the opposite end of which is pivotally connected to a pin 222, opposite ends of which are guided for sliding movement in a pair of registering, longitudinally extending slots 223 that are also formed in opposite sides of the associated housing 216 rearwardly of the slots 219.

Each pin 222 is pivotally connected in its associated housing 216 to one end of another lever 224, the opposite end of which is pivotally connected by a pin 225 to a three-armed lever 227 intermediate the ends thereof. Each lever 227 is pivotally connected at one end in the associated housing 216 to a pin 228, which is carried by the inner end of the associated adjusting pin 72, and which projects at opposite ends through opposed guide slots 220 in the sides of its housing 216. At its opposite end each lever 227 projects through an elongate slot or opening 226 in the inner wall of the associated housing 216, and between the spaced parallel side walls of a guide member 229, which is fastened on the associated housing 216 adjacent the end plate 34. This opposite end of each lever 227 is pivotally connected to a pin 232, which extends slidably through a slot 230 in the lever 227, and opposite ends of which are guided for horizontal sliding movement in registering slots 231 formed in opposite sides of guide member 229. Each pin 232 also is pivotally connected to the end of a reciprocable piston rod 233, which projects from a conventional air cylinder 234 that is fastened to the outside of each housing 216 in alignment with the associated guide member 229.

In use, the cylinders 234 are controlled by the same solenoid valves 140, which in the previous embodiment were employed for controlling the mold operating cylinders 83. When a part is being molded, the piston rod 233 for the associated cylinder 234 is in its retracted position, as shown for example in the upper part of FIG. 6, so that the associated three-armed lever 227 also will have been swung into its solid line position as shown in the upper half of FIG. 6. At this time the associated rod 212 will have been moved into its advanced or mold-closing position in which its axis extends parallel to the axis of shaft 21, and so that its pins 213, 214 and 215, will be located in their respective slots 218 and 219 as shown in the upper half of FIG. 6. Also at this time the links 224 and 221 in the associated housing will be substantially in alignment with each other and with pin 72 and the axis of the associated mold supporting rod 212. It will be apparent that the mold closing force exerted through this linkage on the mold associated section 55 can be adjusted merely by rotating the associated adjusting sleeve 74, thereby shifting pin 228 toward or away from the associated stationary mold section 51.

After a part has been molded, and as each mold is rotated towards its mold-opening and part-ejecting position, the associated cylinder 234, in response to its controlling solenoid valve 140, is operated so as to cause its rod 233 to be advanced from its retracted position as shown at the top of FIG. 6, to its extended or part-ejecting position as shown in solid lines at the bottom of FIG. 6. This causes the attached three-armed lever 227 to be pivoted about pin 228 from its broken to its full line position as shown in the bottom of FIG. 6; and in so doing, lever 227 draws the assocated levers 224, 221 and the attached mold-operating rod 212 toward the left in FIG. 6.

During this movement the pins 213, 214, 215 on the associated rod 212 are first shifted horizontally rearwardly in their associated slots 218, 219 to withdraw the attached mold section 55 and molded part from engagement with the associated stationary section 51. Thereafter the pins 213 and 214 simultaneously engage inclined camming surfaces formed adjacent the rear or left hand ends of each slot 218, 219 as shown in FIG. 6, thereby causing the inner end of the rod 212 (the right end as shown in FIG. 6) to be swung downwardly about pins 215 and through a slot or opening 241 forming in the outer wall of the associated housing 216 adjacent its inner end.

This swinging movement of a rod 212 to its ejecting position thus causes the associated mold section 55 to be swung downwardly from its broken line to its full line position as shown in the bottom of FIG. 6. During this movement the ejection plunger 56 in the mold section 55 is advanced relative to the section by means of a pin which projects from plunger 56 through a slot in the rod 212, and which is connected to a link 242 that is pivotally mounted on the outside of the associated rod 212 rearwardly of the mold section 55. Each link 242 is connected to the operating rod 243 of an ejection cylinder 244 that is attached to the outside of each mold supporting rod 212 intermediate its ends. After the molded part is ejected, continued rotation of shaft 21 causes the cam 152 to operate the solenoid valve 140, which effects retraction of the piston rod 233 of the associated cylinder 234, thereby pivoting rod 212 and its mold section 55 upwardly from its ejecting position, as shown in the lower half of FIG. 6, to its mold closing position as shown in the upper half of the Fig.

From the foregoing, it will be apparent that this modified mechanism for manipulating the movable mold sections 55 has the advantage that during the ejection stage, a respective mold section 55 is swung or pivoted downwardly, or radially outwardly away from the shaft 21, so that the mold face is exposed, both to ease ejection of the molded part, and also to provide ready access to the mold section 55 in the event that it is desired to change or service the mold.

While this application has been illustrated and described in connection with only certain embodiments thereof it will be apparent that it is capable of still further modification, and that this application is intended to cover any such modifications as may fall within the scope of one skilled in the art or the appended claims.

What is claimed is:

1. A rotary molding machine, comprising
   a shaft mounted for rotation about its axis,
   a plurality of rigid plates secured to an surrounding said shaft at axially spaced points therealong, and lying in spaced planes extending transversely of said shaft,
   a plurality of rigid panels secured to said plates to be supported by said plates around the outside of said shaft in angularly spaced planes that extend generally radially of the axis of said shaft,
   a pair of cooperating mold sections mounted in the angular space between each pair of adjacent panels for rotation with said shaft
   means for rotating said shaft to cause the pairs of cooperating mold sections to be rotated successively into a predetermined loading position during each revolution of said shaft,
   means for moving one mold section of each pair thereof from an open to a closed position prior to arrival of said pair of sections at said loading station, and for moving said one mold section back to its open position after a predetermined interval,
   means for injecting a molten molding material into a cavity formed between the confronting surfaces on a pair of said closed mold sections as they pass said loading station, and
   means for ejecting a molded part from said cavity, when said one mold section of a pair thereafter moves to its open position at termination of said predetermined interval.

2. A rotary molding machine as defined in claim 1, wherein
   said plates are circular in cross section and are of equal diameter, and
   said panels are similar in configuration and size.

3. A rotary molding machine as defined in claim 2, wherein
   the number of said panels surrounding said shaft is a multiple of six, and
   the diameter of said plates is proportional to the number of panels surrounding said shaft.

4. A rotary molding machine as defined in claim 1, wherein,
   each of said mold sections has therethrough an axial bore,
   the axial bores of the two mold sections of each cooperating pair thereof are disposed in coaxial, registering relation, when said one section of a pair is in its closed position,
   said injecting means is operable to inject molten molding material into one of said registering bores of a pair of mold sections, when said one section thereof is in its closed position, and
   said ejecting means is operable to close the other axial bore in the last-named pair of mold sections during injection of molding material into said one bore.

5. A rotary molding machine as defined in claim 4, wherein said other mold sections are secured to said shaft for rotation thereby and have the axial bores thereof extending parallel to the axis of said shaft and in equi-spaced radial relation thereto, and said one mold sections are movably mounted on said shaft for rotation therewith, and for reciprocation parallel to the axis of said shaft between their open and closed positions, and with their axial bores disposed in coaxial, registering relation with the bores in said other mold sections.

6. A rotary molding machine as defined in claim 5, wherein said means for moving said one mold sections comprises a plurality of sets of collapsible links each of which sets is connected to one of said one mold sections, and is operable independently of the other sets of links to reciprocate the associated one mold section, and manually operable means connected to each set of links to adjust the distance the associated one mold section is reciprocated thereby to adjust the closing force exerted by the last-named mold section when it is moved to its closed position.

7. A rotary molding machine as defined in claim 4, wherein said injection means comprises a rotary dispenser having thereon a plane surface a portion of which rotates in sliding, coplanar engagement with one side of each of said other mold sections as the latter rotate past said loading station, said plane surface of said dispenser having therein a plurality of recesses angularly spaced about the axis of said dispenser to be rotated successively into registering relation with one end of the axial bore in said other mold sections as the latter are rotated by said shaft past said loading station, said recesses in said dispenser communicating with a supply of molten molding material under pressure, and being disposed to have one recess thereof remain in communication with said one end of the axial bore in a mold section for a predetermined degree of rotation of said shaft and said dispenser, thereby to fill the last-named bore with said molten molding material during said predetermined degree of rotation of said shaft.

8. A rotary molding machine as defined in claim 7, including a stationary cover member overlying the remaining portion of said plane surface on said dispenser to prevent discharge of molding material from the recesses in said dispenser which open on said remaining portion of said dispenser surface.

9. A rotary molding machine as defined in claim 7, including means connecting said dispenser to said means for rotating said shaft thereby to synchronize the rotation of said dispenser with said shaft.

10. A rotary molding machine as defined in claim 4, wherein said injection means comprises means for feeding a supply of molten molding material to the bore in each of said other molding sections as the latter approach said loading station, a cylindrical injection ram mounted adjacent each of said other mold sections at the side thereof remote from said one mold section of a pair, and reciprocable into and out of the axial bore in the associated other mold section to compress the supply of molding material therein into the cavity associated with the last-named section, and means for reciprocating each of said injection rams each time a respective ram passes said loading station.

11. A rotary molding machine as defined in claim 10, wherein said ejecting means comprises a pin mounted in the bore in each of said one mold sections and having a head which projects into the cavity formed by a pair of mold sections, when said one section thereof is in its closed position, said head of each of said pins being shaped to cause the molded part in the associated cavity to remain momentarily attached to the associated pin, when the associated one mold section is moved to its open position, and an ejector element slidable in each of said pins into and out of an ejecting position in which it pushes a molded part off the head of the associated pin when the associated one mold section is moved to its open position.

12. A rotary molding machines as defined in claim 10, wherein said means for reciprocating said injection rams comprises a first set of hydraulic cylinders operatively connected to said rams, said means for moving said one mold sections comprises a second set of hydraulic cylinders operatively connected to said one mold sections, two pairs of plenums surround said shaft and are connected to said first and second sets of cylinders, respectively, and pump means is connected to one plenum of each pair thereof to supply fluid under pressure from a sump to one plenum of each pair thereof, and the other plenum of each pair is connected to said sump to return fluid thereto after operation of said cylinders.

13. A rotary molding machine as defined in claim 1, wherein said means for moving said one mold section of each pair includes means for imparting reciprocable and swinging movement to said one mold section of a pair during movement thereof between its open and closed positions.

14. A rotary molding machine as defined in claim 13, including manually operable means for adjusting the extent of reciprocation of each of said one mold sections of a pair, thereby to adjust the closing force exerted by the last-named section upon movement thereof to its closed position.

15. A rotary molding machine of the continuous injection type, comprising a supply of molten molding material, a turret of generally cylindrical configuration mounted for rotation about its axis, and for movement into and out of a loading station adjacent said supply, a rotary dispenser connected to said supply and mounted to rotate in synchronization with said turret, and about an axis parallel to the turret axis, when the turret is at said loading station, a plurality of molds mounted on said turret at angularly spaced points about the axis thereof and supported on said turret for rotation thereby successively into operative relation with said dispenser, and means operative during the synchronized rotation of said turret and said dispenser successively to inject a supply of molding material into a cavity in each of said molds during each revolution of said turret, each of said molds comprising a pair of separate sections at least one of which is movable to a closed position relative to the other as said mold approaches a loading position adjacent said dispenser, and is movable to an open position after passing said loading position thereby to permit discharge of a molded part from the cavity in said mold.

16. A rotary molding machine as defined in claim 15 including
a frame,
means supporting said turret on said frame for rotation about a horizontal axis, and
means supporting said frame for movement toward and away from said dispenser, thereby selectively to move said turret into and out of, respectively, said loading station.

17. A rotary molding machine as defined in claim 15, including
means securing said other mold sections to said turret for rotation thereby successively into said loading positions in which molding cavities in said other sections are momentarily placed in communication with said injection means to receive a supply of molding material therefrom, and
means movably mounting said one mold sections on said turret for rotation therewith, and operable to advance each of said one sections to its closed position over the molding cavity in the other mold section of a pair as the latter section approaches its loading position, and to withdraw said one mold section away from the other section of a pair a predetermined time after the latter has passed its loading position.

18. A rotary molding machine as defined in claim 17, including
means in said one mold section of each pair for withdrawing a molded part from the molding cavity of said other section of the pair as said one section is moved away from said other section, and
means for ejecting the molded part from said one mold section during movement thereof away from said other section.

19. A rotary molding machine as defined in claim 17, wherein said mounting means includes means for reciprocating each of said one mold sections linearly into and out of its closed position relative to the other mold section of a pair.

20. A rotary molding machine as defined in claim 17, wherein said mounting means includes means for swinging each of said one mold sections angularly about an axis normal to the axis of said turret during movement of the last-named section into and out of, respectively, its closed position.

21. A rotary molding machine as defined in claim 17, wherein said turret comprises
a shaft the axis of which comprises said turret axis,
a plurality of panels secured to and projecting in radial planes from the outer periphery of said shaft at equiangularly spaced points about the axis thereof, and
a plurality of axially spaced, panel-supporting members secured to said shaft at axially spaced points therealong and extending between said panels to retain the equiangular spacing thereof.

22. A rotary molding machine as defined in claim 21, wherein one of said molds is located between each pair of adjacent panels with said other mold sections being releasably secured to one of said panel-supporting members, and with each of said one mold sections being mounted for reciprocation parallel to said shaft during at least part of its movement toward and away from, respectively, said other mold section of a pair.

23. A rotary molding machine as defined in claim 17, including
a plurality of ports in said dispenser operatively connected successively with the cavities in said other mold sections as the latter pass said loading station, and
a plurality of hydraulically operated rams mounted on said turret in registry with bores in said other mold sections and operative momentarily to eneter the last-named bores and to inject molding material therein into the associated mold cavity after the latter passes said loading station.

24. A rotary molding machine as defined in claim 23, including
a first plurality of switches for controlling the operation of said rams,
a second plurality of switches for controlling the operation of said mounting means for said one mold sections to effect movement thereof into and out of their closed positions, and
a pair of spaced ring cams surrounding said turret and registrable, respectively, with said first and second pluralities of switches to effect predetermined, cylical operation thereof during rotation of said turret.

* * * * *